US010178012B2

United States Patent
Suh et al.

(10) Patent No.: US 10,178,012 B2
(45) Date of Patent: Jan. 8, 2019

(54) SYSTEMS AND METHODS FOR A SOUNDING FRAME IN AN IEEE 802.11AX COMPLIANT NETWORK

(71) Applicant: Huawei Technologies Co., Ltd., Shenzhen (CN)

(72) Inventors: Jung Hoon Suh, Kanata (CA); Osama Aboul-Magd, Kanata (CA); Jiayin Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 63 days.

(21) Appl. No.: 15/068,188

(22) Filed: Mar. 11, 2016

(65) Prior Publication Data

US 2017/0104659 A1 Apr. 13, 2017

Related U.S. Application Data

(60) Provisional application No. 62/239,441, filed on Oct. 9, 2015.

(51) Int. Cl.
*H04L 12/26* (2006.01)
*H04B 7/06* (2006.01)
*H04W 24/06* (2009.01)
*H04W 84/12* (2009.01)

(52) U.S. Cl.
CPC ........... *H04L 43/10* (2013.01); *H04B 7/0619* (2013.01); *H04W 24/06* (2013.01); *H04W 84/12* (2013.01)

(58) Field of Classification Search
None
See application file for complete search history.

(56) References Cited

U.S. PATENT DOCUMENTS

| 2007/0270173 | A1* | 11/2007 | Niu ..................... H04B 7/0413 455/522 |
| 2012/0106531 | A1 | 5/2012 | Seok et al. |
| 2014/0044069 | A1 | 2/2014 | Bao et al. |
| 2015/0304007 | A1* | 10/2015 | Chu ..................... H04B 7/0417 375/267 |

(Continued)

FOREIGN PATENT DOCUMENTS

CN 102158975 A 8/2011

OTHER PUBLICATIONS

Title: Reducing Channel Sounding Protocol Overhead for 11 ax Author: Narendar Madhavan & 5 others Date: Sep. 14, 2015.*

(Continued)

*Primary Examiner* — Joshua Kading
*Assistant Examiner* — Lalita W Pace
(74) *Attorney, Agent, or Firm* — Slater Matsil, LLP

(57) ABSTRACT

System and method embodiments for generating and transmitting a sounding frame in wireless network. In an embodiment, a method for uplink multi-user feedback polling in a wireless network includes generating, by an access point (AP) in the wireless network, a sounding frame including a physical layer (PHY) trigger and a list of stations (STAs) to provide feedback, the PHY trigger indicating that the STAs in the list of STAs are to perform channel estimation; transmitting, by the AP, the sounding frame to one or more STAs; and receiving, by the AP, one or more uplink multi-user feedback frames from the STAs.

12 Claims, 3 Drawing Sheets

(56) References Cited

U.S. PATENT DOCUMENTS

| | | | |
|---|---|---|---|
| 2016/0100396 A1* | 4/2016 | Seok | H04L 5/003 370/329 |
| 2016/0165574 A1* | 6/2016 | Chu | H04L 5/0007 370/312 |
| 2016/0262050 A1* | 9/2016 | Merlin | H04L 5/0053 |
| 2016/0359653 A1* | 12/2016 | Lee | H04L 27/2613 |
| 2017/0048844 A1* | 2/2017 | Chen | H04W 72/0413 |
| 2017/0070914 A1* | 3/2017 | Chun | H04L 1/0026 |

OTHER PUBLICATIONS

Title: Preamble Structure in 802.11ax Author: Yujin Noh & 3 others Date: May 2015.*
Title: HE-SIG-B Structure Author: Joonsuk Kim & many others Date: Jul. 2015.*
Title: HE-SIG-B Contents Author: Kaushik Josiam & many others Date: Sep. 2015.*

* cited by examiner

SYSTEMS AND METHODS FOR A SOUNDING FRAME IN AN IEEE 802.11AX COMPLIANT NETWORK

This application claims the benefit of U.S. Provisional Application No. 62/239,441, filed on Oct. 9, 2015, which application is hereby incorporated herein by reference.

TECHNICAL FIELD

The present invention relates to a system and method for wireless communications, and, in particular embodiments, to a system and method for a sounding frame in an IEEE 802.11ax compliant network.

BACKGROUND

Wi-Fi™ telecommunications technology allows electronic devices to exchange data wirelessly (using radio waves) over computer networks, including high-speed Internet connections. Wi-Fi compliant typically refers to equipment certified to communicate over wireless local area networks (WLAN) based on the Institute of Electrical and Electronics Engineers' (IEEE) 802.11 standards. A wireless user device, such as a station (STA), can connect to a network resource such as the Internet via a wireless network access point (AP) using a Wi-Fi radio. Examples of stations include smartphones, personal computers (laptops and desktops), video-game consoles, smartphones, computer tablets, and digital audio players. Such an AP (also referred to as hotspot) generally has a range of about 20 meters indoors and a greater range outdoors.

In Wi-Fi, multiple stations may communicate with a single AP at different times, e.g., one station at a time. The AP sends data to each station via a downlink and receives data from the station via an uplink. Enabling multiple stations to communicate with an AP (or multiple APs) at the same time can improve communications in Wi-Fi, such as to boost the throughput of the uplink connection.

SUMMARY

An embodiment method for uplink multi-user feedback polling in a wireless network includes generating, by an access point (AP) in the wireless network, a sounding frame including a physical layer (PHY) trigger and a list of stations (STAs) to provide feedback, the PHY trigger indicating that the STAs in the list of STAs are to perform channel estimation; transmitting, by the AP, the sounding frame to one or more STAs; and receiving, by the AP, one or more uplink multi-user feedback frames from the STAs.

An embodiment access point (AP) includes a processor and a non-transitory computer readable storage medium storing programming for execution by the processor, the programming including instructions for: generating a sounding frame including a physical layer (PHY) trigger and a list of stations (STAs) to provide feedback, the PHY trigger indicating that the STAs in the list of STAs are to perform channel estimation; transmitting the sounding frame to one or more STAs via a wireless network; and receiving one or more uplink multi-user feedback frames from the STAs.

BRIEF DESCRIPTION OF THE DRAWINGS

For a more complete understanding of the present invention, and the advantages thereof, reference is now made to the following description taken in conjunction with the accompanying drawings, in which.

DETAILED DESCRIPTION OF ILLUSTRATIVE EMBODIMENTS

The structure, manufacture and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

An embodiment method for uplink multi-user feedback polling includes an access point (AP) generating a physical layer (PHY) trigger-based sounding frame comprising a list of stations (STAs) to provide feedback, long training fields for computing channel estimation information by the STAs, and a high efficiency signal B (HE-SIG-B) field comprising uplink multi-user feedback scheduling information. The method further includes transmitting the PHY trigger-based sounding frame, and receiving a plurality of uplink multi-user feedback frames from the STAs.

An embodiment AP includes a processor and a non-transitory computer readable storage medium storing programming for execution by the processor. The programming includes instructions for generating a PHY trigger-based sounding frame comprising a list of STAs to provide feedback, long training fields for computing beacon frame information by the STAs, and a HE-SIG-B field comprising uplink multi-user feedback scheduling information, transmitting the PHY trigger-based sounding frame, and receiving a plurality of uplink multi-user feedback frames from the STAs.

Figure 1:
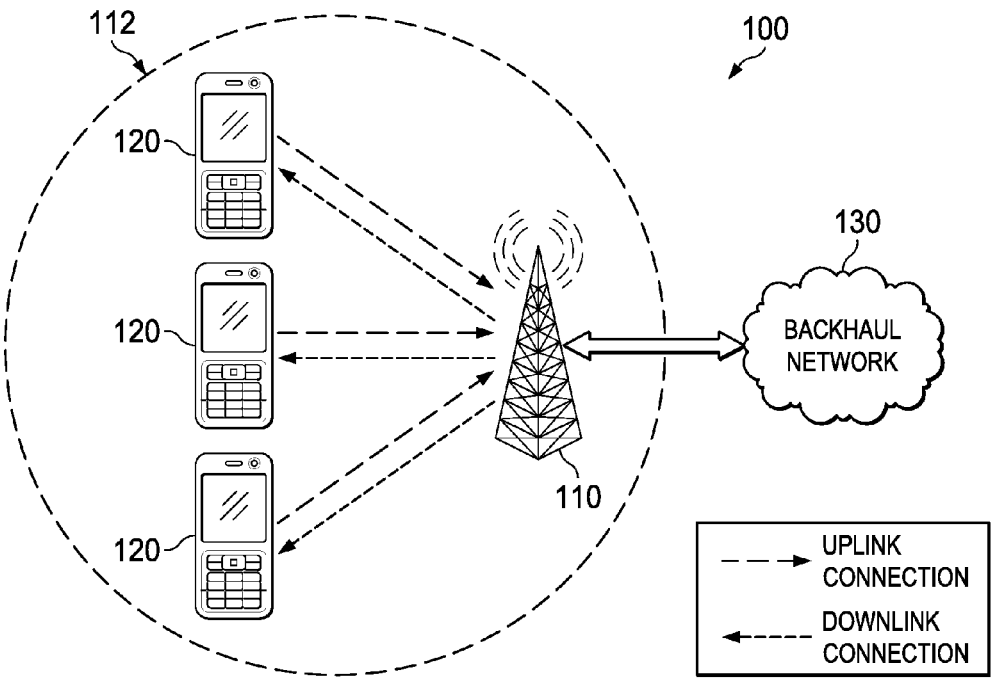
FIG. 1 illustrates a network for communicating data.

FIG. 1 illustrates a network 100 for communicating data. In an embodiment, the network 100 is an IEEE 802.11ax compliant network. The network 100 comprises an access point (AP) 110 having a coverage area 112, a plurality of stations (STAs) 120, and a backhaul network 130. As used herein, the term AP may also be referred to as a TP and the two terms may be used interchangeably throughout this disclosure. The AP 110 may comprise any component capable of providing wireless access by, inter alia, establishing uplink (larger dashed line) and/or downlink (smaller dashed line) connections with the STAs 120. The STAs 120 may include any component capable of establishing a wireless connection with the AP 110. Examples of STAs 120 include mobile phones, tablet computers, and laptop computers. The backhaul network 130 may be any component or collection of components that allow data to be exchanged between the AP 110 and a remote end (not shown). In some embodiments, the network 100 may comprise various other wireless devices, such as relays, femtocells, etc.

The AP 110 constructs a single sounding frame that includes a PHY layer trigger and a list of STAs 120 that are to provide channel sounding feedback. The AP 110 transmits the single sounding frame to one or more STAs 120 and receives feedback information from one or more of the STAs 120. The AP 110 uses the feedback from the STAs 120 to determine beamforming parameters and transmits data to the STAs using beamforming determined according to the beamforming parameters.

Figure 2:
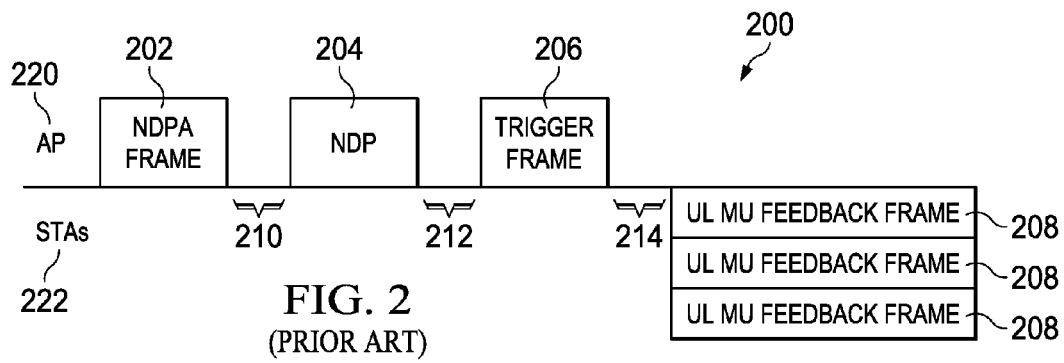
FIG. 2 illustrates a conventional sounding protocol for 802.11ax compliant communications.

FIG. 2 is a diagram of a prior art sounding protocol 200. The current approach to IEEE 802.11ax communications is to apply the sounding protocol 200 shown in FIG. 2 to enable communications of multiple STAs 222 to one or more APs 220 concurrently. The sounding protocol 200 includes three frames 202, 204, 206 transmitted by the AP 220 and feedback frames 208 transmitted by the STAs 222. The AP 220 and the STAs 222 may be implemented as the AP 110 and the STAs 120 in FIG. 1, respectively. The three frames transmitted by the AP 220 include a null data packet announcement (NDPA) frame 202, a null data packet (NDP) frame 204, and a trigger frame 206. The end of the NDPA frame 202 is separated from the beginning of the NDP frame 204 by a first time period 210. The end of the NDP frame 204 is separated from the beginning of the trigger frame 206 by a second time period 212. The end of the trigger frame 206 is separated from the beginning time for the STAs 222 to transmit the uplink (UL) multi-user (MU) channel state information (CSI) feedback (FB) frames 208 by a third time period 214. The NDPA 202 frame indicates the STAs 222 from which a response is requested. The NPDA frame 202 format is not yet determined. The NDP frame 204 carries the long training fields (LTFs) appropriate for the list of STAs 222 in the NDPA frame 202 to compute the beam forming (BF) or channel estimation information correctly. The NDP frame 204 uses the 802.11ax single user (SU) frame format. The trigger frame 206 carries the information for scheduling the UL MU CSI FB information. Multiple STAs 222 may have concurrent UL access to the AP 220 in the same frequency band, which can increase throughput and decrease FB overhead.

Figure 3:
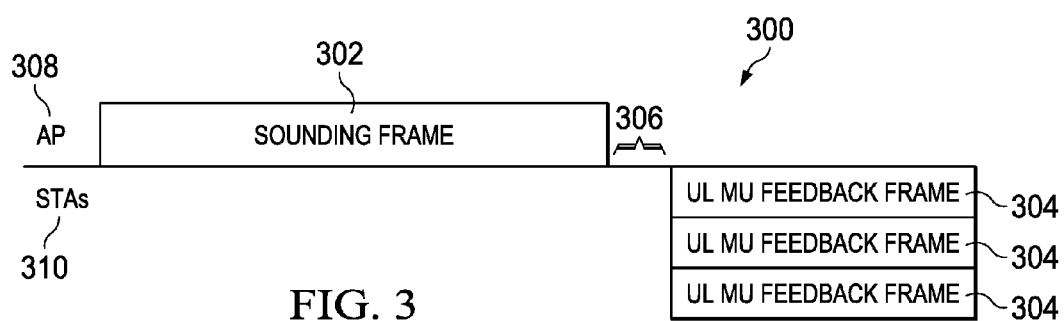
FIG. 3 illustrates a sounding frame combining NDPA, NDP, and trigger frames.

FIG. 3 is a diagram illustrating an embodiment of a sounding frame protocol 300. The sounding frame protocol 300 includes a single sounding frame 302 transmitted by the AP 308 to one or more STAs 310 and UL MU feedback frames 304 transmitted by the STAs 310 to the AP 308. The end of the sounding frame 302 is separated from the beginning of the transmission of the UL MU feedback frames 304 by a time period 306. Instead of three frames, an embodiment utilizes one sounding frame 302 to poll the UL MU feedback frame 304, as shown in FIG. 3.

Figure 4:
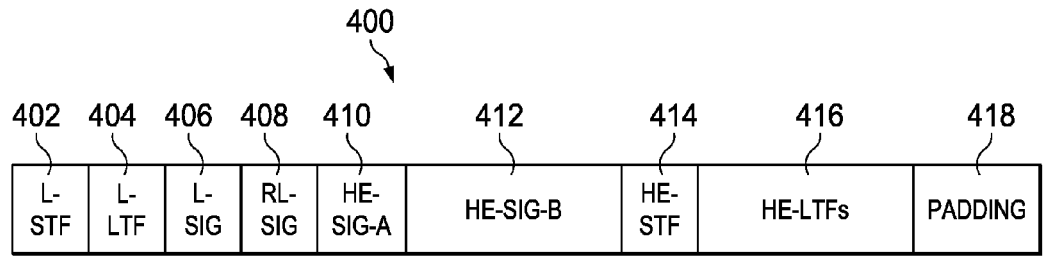
FIG. 4 illustrates a PHY trigger based sounding frame format.

FIG. 4 is a diagram illustrating an embodiment of a sounding frame format 400. The sounding frame format 400 includes a Legacy Short Training Field (L-STF) 402, a Legacy Long Training Field (L-LTF) 404, a Legacy Signal (L-SIG) field 406, a L-SIG Repetition (RL-SIG) field 408, a HE-SIG-A field 410, a HE-SIG-B field 412, a HE-Short Training Field (HE-STF) 414, HE-Long Training Fields (HE-LTFs) 416, and a padding field 418. The padding field 418 provides additional time for the STAs to perform sounding operations and computations.

In an embodiment, the trigger information, which carries the schedule information for the UL MU feedback, is relocated to the HE-SIG-B fields 412. In an embodiment the frame may be referred to as a PHY trigger-based sounding frame. A 1-bit indication in the HE-SIG-A field 410 may be used to indicate the Sounding Frame 400. Alternatively, an earlier indication may be used. The HE-SIG-B field 412 includes a SIG-B common part and a SIG-B dedicated part. The number of bits in the HE-SIG-B field 412 may vary depending on the number of scheduled STAs and available bandwidth. The Resource Unit allocation is done in the SIG-B common part. The STA ID (or AID), Feedback (FB) Type, and Nc Index (Total Number of TX streams, which contain the necessary information for sounding, can be placed in the SIG-B dedicated part of the HE-SIG-B fields 412. However, the FB type is common information for all the scheduled STAs, and thus the FB type can be placed in the SIGB common part of the HE-SIG-B fields 412, or in the HE-SIG-A field 410 if sufficient space is available. The number of HE-LTFs 416 is determined by the total number of TX antennas. Padding 418 may be required at the end of the Sounding Frame 400 to allow the extra time for each STA to complete computing the BF FB information. The HE-STF 414 may not be necessary for AGC re-adjustment, but may be used to provide extra time for the scheduled STAs to turn on an Arithmetic Unit for Sounding Computation.

Figure 5:
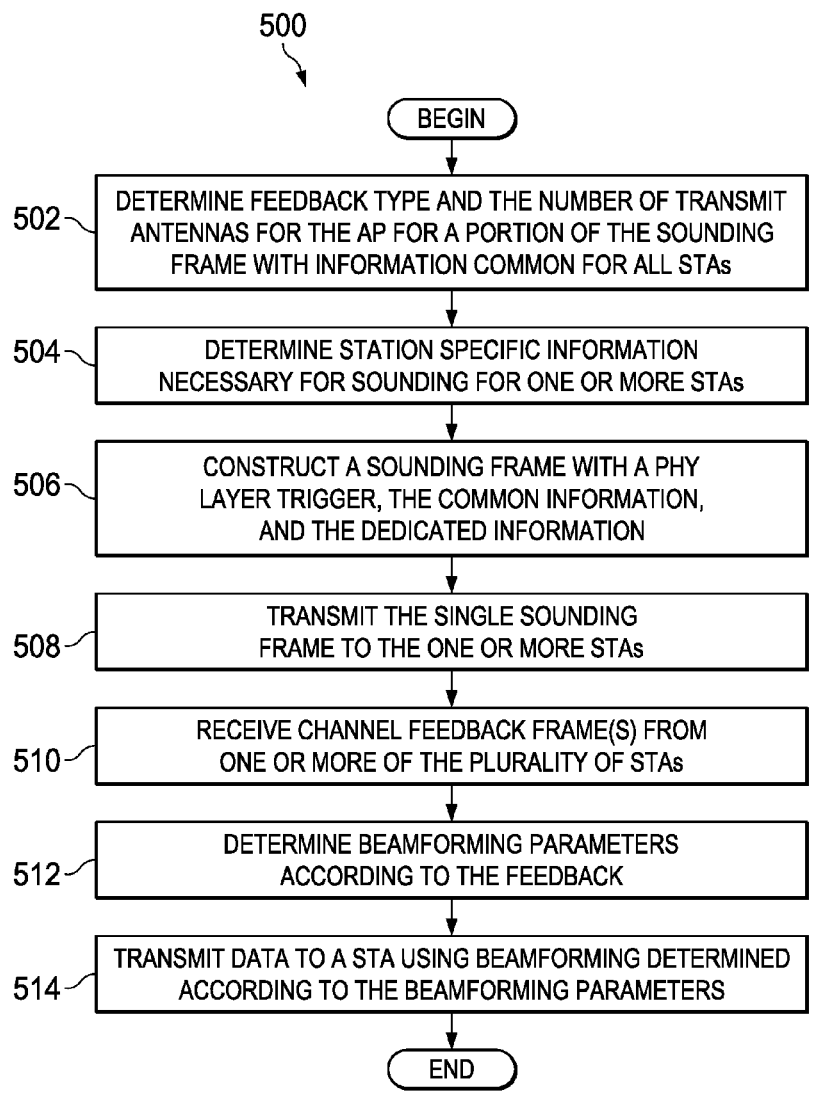
FIG. 5 is a flowchart illustrating a method for forming, transmitting, and using a single frame sounding frame in an IEEE 802.11ax compliant network.

FIG. 5 is a flowchart illustrating a method 500 for forming, transmitting, and using a single frame sounding frame in an IEEE 802.11ax compliant network. The method 500 begins at block 502 where the AP determines the feedback type and the number of transmit antennas in the AP to be inserted into a portion of the sounding frame with information common for all STAs serviced by the AP. The information common for all STAs service by the AP may include the number of transmit antennas, but in some embodiments, does not include the number of transmit streams (Nc) which may not be common to all STAs. The number of transmit streams, (Nc), is limited by the number of receiver antennas for a STA. Thus, Nc may be different for each STA. Nc is the rank information for each STA. At block 504, the AP determines station specific information necessary for sounding for one or more STAs. At block 506, the AP constructs a single sounding frame with a PHY layer trigger, the common information determined in block 502, and the STA dedicated information determined in block 504. The single sounding frame includes a list of STAs that are to perform channel sounding and provide feedback to the AP. At block 508, the AP transmits the single sounding frame to one or more STAs. At block 510, the AP receives channel feedback frame(s) from one or more of the plurality of STAs. At block 512, the AP determines beamforming parameters according to the feedback. At block 514, the AP transmits data to one or more STAs using beamforming determined according to the beamforming parameters determined in block 512, after which, the method 500 ends.

Figure 6:
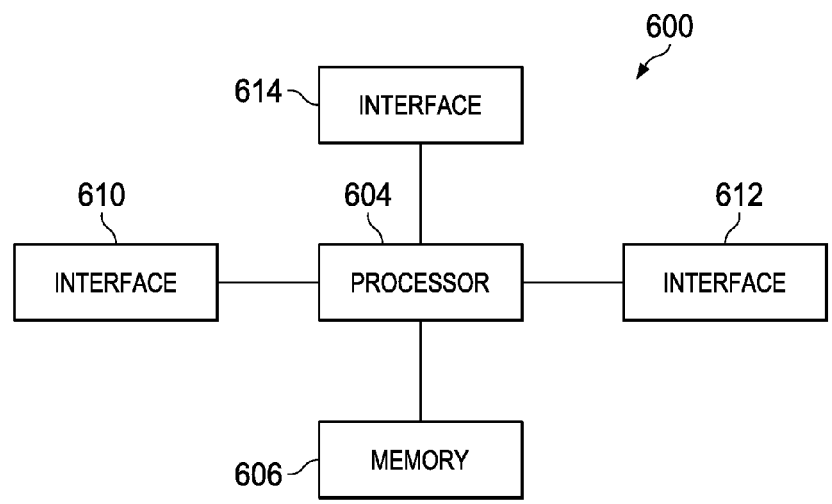
FIG. 6 illustrates a block diagram of an embodiment processing system for performing methods described herein.

FIG. 6 illustrates a block diagram of an embodiment processing system 600 for performing methods described herein, which may be installed in a host device. As shown, the processing system 600 includes a processor 604, a memory 606, and interfaces 610-614, which may (or may not) be arranged as shown in the figure. The processor 604 may be any component or collection of components adapted to perform computations and/or other processing related tasks, and the memory 606 may be any component or collection of components adapted to store programming and/or instructions for execution by the processor 604. In an embodiment, the memory 606 includes a non-transitory computer readable medium. The interfaces 610, 612, 614 may be any component or collection of components that allow the processing system 600 to communicate with other devices/components and/or a user. For example, one or more of the interfaces 610, 612, 614 may be adapted to communicate data, control, or management messages from the processor 604 to applications installed on the host device and/or a remote device. As another example, one or more of the interfaces 610, 612, 614 may be adapted to allow a user or user device (e.g., personal computer (PC), etc.) to interact/communicate with the processing system 600. The processing system 600 may include additional components not depicted in the figure, such as long term storage (e.g., non-volatile memory, etc.).

In some embodiments, the processing system 600 is included in a network device that is accessing, or part otherwise of, a telecommunications network. In one example, the processing system 600 is in a network-side device in a wireless or wireline telecommunications network, such as a base station, a relay station, a scheduler, a controller, a gateway, a router, an applications server, or any other device in the telecommunications network. In other embodiments, the processing system 600 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 7:
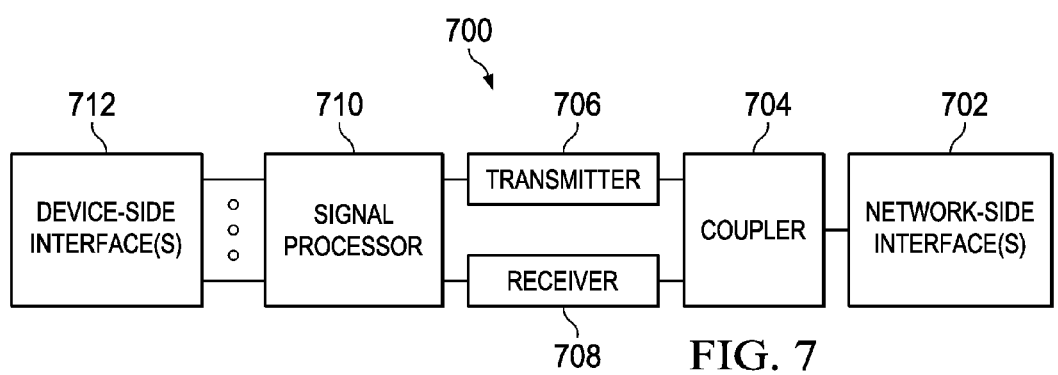
FIG. 7 illustrates a block diagram of a transceiver adapted to transmit and receive signaling over a telecommunications network.

In some embodiments, one or more of the interfaces 610, 612, 614 connects the processing system 600 to a transceiver adapted to transmit and receive signaling over the telecommunications network. FIG. 7 illustrates a block diagram of a transceiver 700 adapted to transmit and receive signaling over a telecommunications network. The transceiver 700 may be installed in a host device. As shown, the transceiver 700 comprises a network-side interface 702, a coupler 704, a transmitter 706, a receiver 708, a signal processor 710, and a device-side interface 712. The network-side interface 702 may include any component or collection of components adapted to transmit or receive signaling over a wireless or wireline telecommunications network. The coupler 704 may include any component or collection of components adapted to facilitate bi-directional communication over the network-side interface 702. The transmitter 706 may include any component or collection of components (e.g., up-converter, power amplifier, etc.) adapted to convert a baseband signal into a modulated carrier signal suitable for transmission over the network-side interface 702. The receiver 708 may include any component or collection of components (e.g., down-converter, low noise amplifier, etc.) adapted to convert a carrier signal received over the network-side interface 702 into a baseband signal. The signal processor 710 may include any component or collection of components adapted to convert a baseband signal into a data signal suitable for communication over the device-side interface(s) 712, or vice-versa. The device-side interface(s) 712 may include any component or collection of components adapted to communicate data-signals between the signal processor 710 and components within the host device (e.g., the processing system 600, local area network (LAN) ports, etc.).

The transceiver 700 may transmit and receive signaling over any type of communications medium. In some embodiments, the transceiver 700 transmits and receives signaling over a wireless medium. For example, the transceiver 700 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 702 comprises one or more antenna/radiating elements. For example, the network-side interface 702 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 700 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a generating unit/module, a calculating unit/module, and/or a determining unit/module. The respective units/modules may be hardware, software, or a combination thereof. For instance, one or more of the units/modules may be an integrated circuit, such as field programmable gate arrays (FPGAs) or application-specific integrated circuits (ASICs).

An embodiment method for uplink multi-user feedback polling in an Institute of Electrical and Electronics Engineers' (IEEE) 802.11ax compliant wireless network includes generating, by an access point (AP) in the IEEE 802.11ax compliant wireless network, a sounding frame including a physical layer (PHY) trigger and a list of stations (STAs) to provide feedback, the PHY trigger indicating that the STAs in the list of STAs are to perform channel estimation; transmitting, by the AP, the sounding frame to one or more STAs; and receiving, by the AP, one or more uplink multi-user feedback frames from the STAs. In an embodiment, the sounding frame further includes long training fields for computer channel estimation information by the STAs. In an embodiment, the sounding frame includes a high efficiency signal B (HE-SIG-B) field including uplink multi-user feedback scheduling information. In an embodiment, the HE-SIG-B field includes a common part and a dedicated part, the common part including information that is common to all of the STAs in the list of STAs and the dedicated part including information for specific to individual STAs for performing channel estimation. In an embodiment, the common part includes feedback type and a number of antennas used by the AP. In an embodiment, the sounding frame includes a high efficiency signal A (HE-SIG-A) field including the PHY trigger. In an embodiment, the method also includes determining, by the AP, beamforming parameters according to information in the uplink multi-user feedback frames; and transmitting, by the AP, data to one of the STAs using beamforming determined according to the beamforming parameters. In an embodiment, the sounding frame includes padding to provide time for each STA to complete computing beamforming feedback information.

An embodiment access point (AP) includes a processor and a non-transitory computer readable storage medium storing programming for execution by the processor, the programming including instructions for: generating a sounding frame including a physical layer (PHY) trigger and a list of stations (STAs) to provide feedback, the PHY trigger indicating that the STAs in the list of STAs are to perform channel estimation; transmitting the sounding frame to one or more STAs via an Institute of Electrical and Electronics Engineers' (IEEE) 802.11ax compliant wireless network; and receiving one or more uplink multi-user feedback frames from the STAs. In an embodiment, the sounding frame further includes long training fields for computer channel estimation information by the STAs. In an embodiment, the sounding frame includes a high efficiency signal B (HE-SIG-B) field including uplink multi-user feedback scheduling information. In an embodiment, the HE-SIG-B field includes a common part and a dedicated part, the common part including information that is common to all of the STAs in the list of STAs and the dedicated part including information for specific to individual STAs for performing channel estimation. In an embodiment, the common part includes feedback type and a number of antennas used by the AP. In an embodiment, the sounding frame includes a high efficiency signal A (HE-SIG-A) field including the PHY trigger. In an embodiment, the programming further includes instructions for determining beamforming parameters according to information in the uplink multi-user feedback frames and transmitting data to one of the STAs using beamforming determined according to the beamforming parameters. In an embodiment, the sounding frame includes padding to provide time for each STA to complete computing beamforming feedback information.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for uplink multi-user feedback polling in a wireless network, the method comprising:
    generating, by an access point (AP), a sounding frame comprising a physical layer (PHY) trigger, a number of HE-LTFs equal to a number of transmit (Tx) antennas, a list of stations (STAs) to provide feedback, uplink multi-user feedback scheduling information, an indication of feedback type, and a number of antennas used by the AP, the PHY trigger indicating that the STAB in the list of STAB are to perform channel estimation, wherein the sounding frame comprises a high efficiency signal B (HE-SIG-B) field comprising the uplink multi-user feedback scheduling information, wherein the HE-SIG-B field comprises a common part and a dedicated part, the common part including information that is common to ail of the STAs in the list of STAs and the dedicated part including information specific to individual STAs for performing channel estimation, wherein the common part includes the feedback type and the number of antennas used by the AP;
    transmitting, by the AP, the sounding frame to one or more of the STAs; and
    receiving, by the AP, one or more uplink multi-user feedback frames from the STAs.

2. The method of claim 1, wherein the sounding frame further comprises long training fields for computing channel estimation information by the STAS.

3. The method of claim 1, wherein the sounding frame comprises a high efficiency signal A (HE-SIG-A)) field comprising the PHY trigger.

4. The method of claim 1, further comprising:
    determining, by the AP, beamforming parameters according to information in the uplink Multi-user feedback frames; and
    transmitting, by the AP, data to one of the STAs using beamforming determined according to the beamforming parameters.

5. The method of claim 1, wherein the sounding frame includes padding to provide time for each STA to complete computing beamforming feedback information.

6. The method of claim 1, wherein the wireless network is an IEEE 802.11ax compliant network.

7. An access point (AP) comprising:
    a processor; and
    a non-transitory computer readable storage medium storing programming for execution by the processor, the programming including instructions for:
    generating a sounding frame comprising a physical layer (PHY) trigger, a number of HE-LTFs equal to a number of transmit (Tx) antennas, a list of stations (STAs) to provide feedback, uplink multi-user feedback scheduling information, an indication of feedback type, and a number of antennas used by the AR, the RHY trigger indicating that the STAs in the list of STAs are to perform channel estimation, wherein the sounding frame comprises a high efficiency signal B (HE-SIG-B) field comprising the uplink multi-user feedback scheduling information, wherein the HE-SIG-B field comprises a common part and a dedicated part, the common part including information that is common to ail of the STAs in the list of STAs and the dedicated part including information specific to individual STAs for performing channel estimation, wherein the common part includes the feedback type and the number of antennas used by the AR;
    transmitting the sounding frame to one or more of the STAs via a wireless network; and
    receiving one or more uplink multi-user feedback frames from the STAs.

8. The AP of claim 7, wherein the sounding frame further comprises long training fields for computing channel estimation information by the STAs.

9. The AP of claim 7, wherein the sounding frame comprises a high efficiency signal A (HE-SIG-A)) field comprising the PHY trigger.

10. The AP of claim 7, wherein the programming further comprises instructions for:
    determining beamforming parameters according to information in the uplink multi-user feedback frames; and
    transmitting data to one of the STAB using bear forming determined according to the beamforming parameters.

11. The AP of claim 7, wherein the sounding frame includes padding to provide time for each STA to complete computing beamforming feedback information.

12. The AR of claim 7, wherein the wireless network is an IEEE 8o2.11ax compliant network.

* * * * *

UNITED STATES PATENT AND TRADEMARK OFFICE
CERTIFICATE OF CORRECTION

PATENT NO. : 10,178,012 B2  
APPLICATION NO. : 15/068188  
DATED : January 8, 2019  
INVENTOR(S) : Jung Hoon Suh Page 1 of 1

It is certified that error appears in the above-identified patent and that said Letters Patent is hereby corrected as shown below:

In Column 7, Line 44, Claim 1, delete "STAB" and insert --STAs--.

In Column 7, Line 45, Claim 1, delete "STAB" and insert --STAs--.

In Column 7, Line 51, Claim 1, delete "ail" and insert --all--.

In Column 8, Line 2, Claim 3, delete "A (HE-SIG-A))" and insert --A (HE-SIG-A)--.

In Column 8, Line 6, Claim 4, delete "Multi-user" and insert --multi-user--.

In Column 8, Line 27, Claim 7, delete "AR, the RHY" and insert --AP, the PHY--.

In Column 8, Line 34, Claim 7, delete "ail" and insert --all--.

In Column 8, Line 39, Claim 7, delete "AR" and insert --AP--.

In Column 8, Line 48, Claim 9, delete "A (HE-SIG-A))" and insert --A (HE-SIG-A)--.

In Column 8, Line 54, Claim 10, delete "STAB using bear forming" and insert --STAs using beamforming--.

In Column 8, Line 59, Claim 12, delete "AR" and insert --AP--.

Signed and Sealed this  
Eighteenth Day of June, 2019

Andrei Iancu  
*Director of the United States Patent and Trademark Office*